April 1, 1941. G. N. KELLEY 2,237,002
RAKE
Filed Nov. 10, 1939
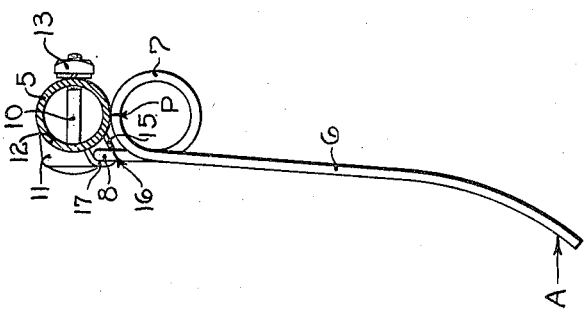
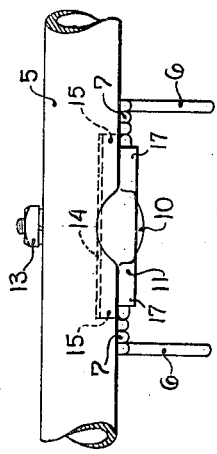
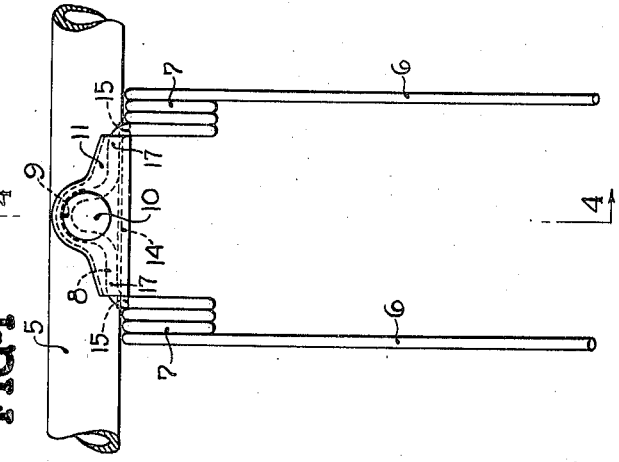
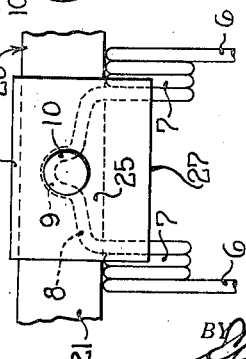
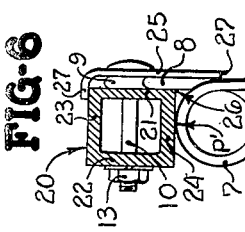
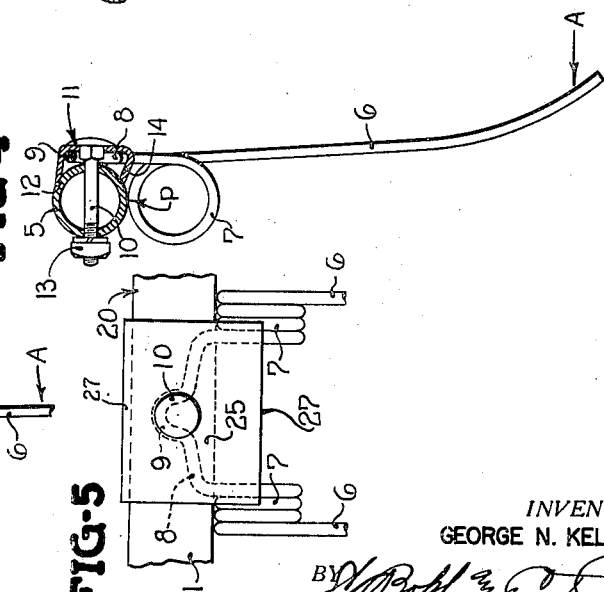
INVENTOR:
GEORGE N. KELLEY
ATTORNEYS.

Patented Apr. 1, 1941

2,237,002

UNITED STATES PATENT OFFICE 2,237,002

RAKE

George N. Kelley, Ottumwa, Iowa, assignor to Dain Manufacturing Company of Iowa, Ottumwa, Iowa, a corporation of Iowa Application November 10, 1939, Serial No. 303,833

4 Claims. (Cl. 56—400)

The present invention relates to side delivery hay rakes, tedders, and other rotary reels of the type wherein dependent tines are mounted on rake bars supported at their ends on revolving spider arms, disks, or equivalent elements by which the tines are maintained at a constant angle to the ground. More specifically, the present invention is concerned with the means for mounting the tines on the rake bars.

The tines used in such machines are generally made from round steel wire and they are formed at their upper ends with horizontal coils to provide the necessary resilience. The rake bars on which the tines are mounted are usually in the form of tubes, and heretofore it has been common practice to mount the tines with the coils encircling the tubes and fixed in position by a bolt passed through the end of the coil into the tube. The tines are frequently formed in pairs from a single piece of wire, with the fastening bolt situated between the coils for fixing the tines to the rake bar. In assembling the tines on the rake bar tube, the coils are passed lengthwise over the tube and thus, if one tine is injured or broken during use, as frequently occurs when the rake is drawn over unseen obstructions, it becomes necessary to disconnect and remove all of the tines between the broken one and the nearest end of the tube to allow for replacement of the broken tine, and then all of these tines must be replaced and reconnected.

The difficulty of thus making repairs on a rake of the construction described above led to the development of what might be termed "quick detachable" rake teeth, of a type whereby any tooth might be removed independently of the others. One such form of rake tooth is shown and described in Patent No. 1,358,481 granted to Traphagen, November 9, 1920, and consists of a double-tine tooth formed from a single length of wire with a spring coil for each tine and an intermediate shank portion that is clamped to the rake bar tube by means of a clamping block. In this construction, the coils do not encircle the rake bar, but are disposed parallel to and at a slight distance from the rake bar, and the teeth are secured to the bar through the agency of a releasable clamping block which engages the intermediate shank portion. By loosening the clamping block for any pair of tines, it is possible to remove that pair of tines and replace them with a new pair without disturbing the other tines on the rake bar.

One difficulty introduced by this type of rake tooth, however, is excessive breakage of the tines at the intermediate shank portion between the fastening bolt and the spring coil, due to the fact that the coil is not held against bodily movement with respect to the rake bar except by the shank portion itself, and the curved cylindrical surface of the rake bar forms, in effect, a fulcrum about which the shank tends to bend when the tine is forced back against the tube. When the tine is released after being bent around the rake bar, the stored up energy in the flexed shank and spring coil causes the tine to whip back in the opposite direction, bending the shank away from the rake bar. This repeated bending and flexing of the shank portion puts a strain on the tempered steel wire that soon results in breakage as the metal becomes "fatigued."

It is the object of the present invention, therefore, to provide improved means for mounting the tines on the rake bar whereby the tines may be quickly and easily removed independently of the others, and in which the flexing or bending of the shank portion between the coils and the fastening bolt is substantially eliminated. I accomplish this object by securing the intermediate shank portion of each pair of tines to the rake bar with clamping means providing support for the spring coils and shank in such a manner that the entire bending force is sustained by the spring coils which are expressly provided for that purpose. In the preferred form, the coils bear against the rake bar and thus are prevented from moving bodily toward the bar.

Other objects and advantages of the present invention will become apparent to those skilled in the art after consideration of the following detailed description of the preferred embodiment thereof, reference being had to the appended drawing, in which—

Figure 1 is a front view of a portion of a rake bar showing a pair of tines mounted thereon according to the principles of my invention;

Figure 2 is a top plan view of the same;

Figure 3 is a side elevational view;

Figure 4 is a cross sectional view taken along the line 4—4 of Figure 1;

Figure 5 is a front view of another embodiment of my invention; and

Figure 6 is a side elevational view of the modification illustrated in Figure 5.

Referring now to the drawing, and more particularly to Figures 1–4, inclusive, the rake bar 5 comprises a pipe of circular cross section. Such a rake bar is normally disposed parallel to the ground and is provided with a plurality of depending teeth or tines 6 spaced at regular intervals along the length thereof. The tines 6 are preferably made in pairs, as shown in the drawing, from a single piece of wire formed to provide a pair of coaxial spring coils 7 disposed on a generally horizontal axis and axially spaced, the outer end of each coil terminating in the downwardly extending tine portion, and the inner end extending upwardly from the coil and providing a supporting shank portion 8. Formed in the shank portion 8 substantially midway between the coils 7 is an attaching loop 9 which is adapted to embrace a fastening bolt 10. A clamping block or clip, designated generally by the reference numeral 11, is provided for the purpose of rigidly securing the pair of tines to the rake bar 5, and is suitably shaped to securely engage the shank portion 8 and attaching loop 9 of the teeth. The clamping block 11 has a cylindrically curved face 12 which is adapted to fit snugly against the front side of the tubular rake bar 5, and this block is rigidly clamped to the rake bar by means of the fastening bolt 10 and nut 13. In the preferred form of my invention, a lip 14 on the clip is bent back under the horizontal portion of the shank 8 between the coils 7 and abuts against the rake bar 5, with shoulders 15 at opposite ends thereof projecting laterally outward beneath and engaging the shank at 16 (Figure 3) to provide bearing support therefor against bending toward or around the rake bar. The outer ends of the clip 11 overlap the shank portions 8 at 17 and restrains the spring coils from whipping forwardly after striking an obstruction. The clip 11, being preferably formed of light gauge sheet metal, tends to yield slightly under the flexing action of the shank, and acts to dampen the oscillations of the spring wire by absorbing some of the energy released by the stressed spring. Additional support for the rake teeth is provided by engagement of the coils 7 with the under side of the rake bar 5 at P, which serves to prevent bodily movement of the coils with respect to the rake bar when pressure is exerted against the tines in the direction indicated by the arrow A. Such pressure causes the coils to exert an upward thrust against the rake bar at P and to stress the shank 8 in tension, but since the spring wire of which the tooth is made is far stronger in tension than in bending, it will be seen that the shank is easily capable of resisting the tension component of any force applied at A in the general direction of the arrow. Furthermore, since there is no appreciable bending action in the shank 8, the likelihood of fatigue failure is greatly reduced.

Other methods of bracing the attaching shank 8 against the rake bar will occur to those skilled in the art such as, for example, by welding or otherwise fixing a lug on the shank of the tooth at 16 to bear against the rake bar; or by welding a supporting lug on the rake bar 5 to bear against the shank at 16; or by forming a flat surface on the round rake bar pipe 5 to which the shank 8 may be clamped. One modified form of my invention is illustrated in Figures 5 and 6 of the drawing, in which the rake teeth 6 are mounted on a rake bar 20 of square cross section having front and rear vertical faces 21, 22, respectively, and top and bottom horizontal faces 23, 24, respectively. The shank 8 and attaching loop 9 of the rake tooth are secured to the front face 21 of the bar 20 and are clamped thereto by means preferably consisting of a rectangular clamping plate or clip 25 having a suitable hole formed therein through which the fastening bolt 10 is passed. The bolt 10 also extends through aligned holes in the front and rear faces 21, 22 of the rake bar 20 and is secured by the nut 13. The clamping plate 25 is prevented from turning on the bolt 10 by means of a lip 27 formed by bending the upper edge of the plate rearwardly so as to overlie the top face 23 of the rake bar. In this instance the corner 26 formed by the junction of sides 21 and 24 of the rake bar serves as the supporting shoulder under the shank 8 of the rake tooth, while the coil 7 bears upwardly at P' against the bottom face 24 of the rake bar. In this modification, the plate 25 is extended below the bar 20 terminating at a lower edge 27, which bears against the front of the coils, to restrain the latter from rebounding forwardly after striking an obstruction, and thus preventing an excessive forward deflection that might tend to impose a concentrated stress in the shank portion 8.

From the foregoing, it will be seen that the teeth of my improved rake structure are quickly and easily detachable from the rake bar without disturbing the other teeth thereon, and that the strain on the shank portion 8 of the tooth is greatly lessened by providing solid support beneath the shank at 16 and by bracing the coil against the rake bar at P.

What I claim as my invention is:

1. In a rake structure comprising a cylindrical rake bar and a pair of rake teeth formed to provide a pair of coaxial spring coils each terminating at its end in a rake tine and the portion intermediate the coils constituting a shank adapted to be secured in juxtaposition to said rake bar, a clamping member disposed between said coils and engageable with said shank for securing the same rigidly to one side of the rake bar with said coils bearing upwardly against the bottom of the rake bar, and a pair of oppositely extending shoulders formed at the ends of said clamping member and engaging said shank intermediately between the rake bar and spring coils, said shoulders supporting the shank against bending movement toward the rake bar when the teeth are flexed.

2. The combination with a rake bar and a tooth having a horizontally disposed spring coil terminating at one end in a downwardly extending tine and at the other end in an attaching shank, of a clip for securing said tooth to the rake bar, said clip having a shoulder extending between the rake bar and shank adjacent the coil to brace the shank against bending toward the rake bar.

3. The combination with a cylindrical rake bar and a tooth having a pair of spaced coaxial spring coils connected together by an attaching shank, each of the coils terminating at its outer end in a tine, of a sheet metal clip for mounting said tooth on the rake bar, and a fastening bolt extending through aligned holes in the clip and rake bar, said clip overlying said shank between said coils and having downwardly turned sides contacting the bar at circumferentially spaced points on opposite sides of the bolt, and said clip having laterally projecting shoulders at opposite ends thereof extending between the rake bar and the shank and contacting the latter adjacent the spring coils to prevent the shank from bending toward the rake bar.

4. In a rake structure including a cylindrical rake bar and a tooth having a pair of spaced tines connected together by an attaching shank, a clip for mounting said tooth on the rake bar, said clip being formed of sheet metal and having a substantially flat top portion overlying the shank of the tooth and inwardly turned sides extending around said shank and contacting the rake bar at circumferentially spaced points, and a bolt extending through said top portion of the clip for tightly clamping the shank between the rake bar and the top portion of the clip and the sides of the clip against the rake bar.

GEORGE N. KELLEY.